United States Patent [19]

Stacey

[11] Patent Number: 4,499,470
[45] Date of Patent: Feb. 12, 1985

[54] METHOD OF MEASURING SEA SURFACE WATER TEMPERATURE WITH A SATELLITE INCLUDING WIDEBAND PASSIVE SYNTHETIC-APERTURE MULTICHANNEL RECEIVER

[75] Inventor: Joseph M. Stacey, La Canada, Calif.

[73] Assignee: The United States of America as represented by the Administrator of the National Aeronautics and Space Administration, Washington, D.C.

[21] Appl. No.: 375,620

[22] Filed: May 6, 1982

[51] Int. Cl.³ .................. H04B 7/185; G01W 1/08
[52] U.S. Cl. .................................. 343/352; 374/122
[58] Field of Search .............. 343/351, 352; 374/122

[56] References Cited
U.S. PATENT DOCUMENTS

| | | | |
|---|---|---|---|
| 3,737,905 | 6/1973 | Haroules et al. | 343/351 |
| 3,911,435 | 10/1975 | Mardon et al. | 343/100 ME |
| 4,081,679 | 3/1978 | Cohn | 250/338 |
| 4,178,100 | 12/1979 | Levis | 343/351 X |
| 4,258,366 | 3/1981 | Green | 343/786 |

Primary Examiner—Theodore M. Blum
Assistant Examiner—Gilberto Barrón, Jr.
Attorney, Agent, or Firm—Paul F. McCaul; John R. Manning; Thomas H. Jones

[57] ABSTRACT

A wideband passive synthetic-aperture multichannel receiver (20) with an antenna (15) is mounted on a satellite 10 which travels in an orbit above the Earth passing over large bodies of water (12) e.g. the Atlantic Ocean. The antenna is scanned (16) to receive signals over a wide frequency band from each incremental surface area (pixel) of the water (P1, P2, etc.) which are related to the pixel's sea temperature. The received signals are fed to a plurality of channels (C1–C10) which are tuned to separate selected frequencies (f1–f10). Their outputs are fed to a processor (25) with a memory (30) for storage therein. As the antenna points to pixels (footprint FP 1-1, etc.) within a calibration area (A1) around a buoy (B1) of known coordinates, signals are likewise received and stored. From the buoy exactly measured sea temperature is received. After passing over several calibration areas, a forward stepwise regression analysis is performed to produce an expression which selects the significant from the insignificant channels and assigns weights (coefficients) to them. The expression is used to determine the sea temperature at each pixel based on the signals received therefrom. Wind temperature, pressure, and wind speed at each pixel can also be calculated.

3 Claims, 6 Drawing Figures

FIG. 4

| | C1 | C2 | ------ | C9 | C10 | COORDINATES LAT. | LONG. |
|---|---|---|---|---|---|---|---|
| P1 | | | | | | | |
| P2 | | | | | | | |
| P3 | | | | | | | |
| FP1-1 | 260 | 263 | -------- | 264 | 259 | | |
| FP2-1 | 258 | 259 | ------ | 251 | 240 | | |
| | | | | | | | |
| FP5-1 | 255 | 254 | ------ | 257 | 259 | | |
| P4 | 250 | 40 | ------ | 10 | 240 | | |
| P5 | | | | | | | |
| P6 | | | | | | | |
| P7 | | | | | | | |
| FP1-2 | 240 | 240 | ------- | 231 | 238 | | |
| FP2-2 | 237 | 236 | -------- | 240 | 230 | | |
| | | | | | | | |
| FP5-2 | 239 | 240 | -------- | 250 | 249 | | |
| P8 | | | | | | | |
| P9 | | | | | | | |

30

METHOD OF MEASURING SEA SURFACE WATER TEMPERATURE WITH A SATELLITE INCLUDING WIDEBAND PASSIVE SYNTHETIC-APERTURE MULTICHANNEL RECEIVER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to microwave radiometry and more particularly, to a wideband synthetic-aperture multichannel correlation receiver.

2. Description of the Prior Art

There are certain phenomena on our Earth which have great significance, from military and/or commercial points of view. One such phenomenon is the water temperature of the oceans or other large bodies of water. Knowing the temperature of the water over large areas is of importance for military purposes. It is also of importance from a commercial point of view, since ocean water temperature affects commercial fishing. Theoretically, one can take direct measurements of the water temperature at specific locations. However, due to the large surface area of the oceans, taking direct water temperature measurements over any large surface area of hundreds of thousands of square miles is clearly impractical.

At present, there are several buoys which are permanently anchored at very precisely-known locations in the Atlantic Ocean off the Eastern Coast of the United States. On each of these buoys a very precise thermometer is used to measure water temperature. Equipment is also included to enable a satellite, which makes repeated passes over the area, to receive the actually measured water temperature at each buoy as the satellite's antenna points at the buoy. Thus, values of precisely known water temperatures at the buoys are available in the satellite for transmission to Earth. However, the number of buoys is very small.

At present, there are only about 6 such buoys in locations from off New England down to off South Carolina and out several hundred miles, thus being spread out over an ocean surface area of over 150,000 square miles. Thus, even though the water temperature at each buoy is known, the water temperature at small areas, hereafter referred to as pixels, at significant distances from any of these buoys is not known.

One may obtain a very rough approximation of the temperature of a pixel between two buoys based on the measured temperatures at the buoys. However, these approximations are too rough and, therefore, are of little, if any, use. A need therefore exists for an arrangement for obtaining reasonably precise measurements of sea or water temperature over a large area.

The above-referrred to buoys also provide the satellite with measurements of other phenomena, e.g. wind temperature, wind speed. An arrangement which can use these phenomena measurements to obtain precise measurements thereof at locations remote from any of the buoys is highly desirable.

Some prior art systems use an arrangement wherein signals are received by an antenna and fed to a plurality of radiometers, each tuned to a separate frequency. Measurements are made based on a theoretical model in which it is assumed that signals at different frequencies are indicative of different phenomena. For example, signals at frequencies of 6 GHz, 18 GHz, 21 GHz and 27 GHz are assumed to be indicative of water temperature, moderate or heavy rain, water vapor, and light rain, respectively. In the prior art any calibration is not done against the true surface, i.e. the water itself. Rather, periodically the antenna is disconnected from the radiometers and signals are applied to them from special sources of hot and cold temperatures.

Such a prior art system does not provide sufficiently accurate data, due to the fact that any calibration is not done against the true surface. All measurements are subject to error due to the conditions of the atmosphere between the ocean surface and the antenna. Also, the outputs of the radiometers are not combined in a manner so as to improve signal to noise ratio, by greatly increasing the resolution to be greater than even the aperture of the narrowest beam.

SUMMARY OF THE INVENTION

In accordance with the present invention, a broadband multidimensional correlation receiver with its associated antenna are incorporated in the satellite. As the satellite travels above the ocean, signals from each pixel are received by the antenna. These signals which are representative of the pixel's water temperature, and which are over a wide band of frequencies, are fed to a set of receiver channels, each with a feed which is tuned to a different frequency within the frequency band. The output of the channels for each pixel are stored for subsequent processing. As the satellite passes to within a selected radius from each buoy, a selected number of pixel measurements are taken and stored. Also stored in the satellite is the received, actually-measured water temperature at the buoy. Based on the stored outputs of the channels for received signals, which are related to the water temperatures at pixels within selected radii at at least two buoys and the actually measured temperatures, a calibration process is performed. Then the stored signals for each pixel, remote from each buoy, are processed to determine the water temperature at the pixel. Measurements of other phenomena are also performed or will be explained hereafter.

BRIEF DESCRIPTION OF THE DRAWINGS

FIG. 4 is a simplified diagram of a memory in the processor, shown in FIG. 3;

DETAILED DESCRIPTION OF THE DRAWINGS

The novel features of the invention will first be explained in connection with specific simplified examples and particular measurements values. However, as will become apparent, the invention is not limited thereto. A preferred arrangement will be described. Thus, the invention is intended to be limited only by the scope of the appended claims.

Figure 1:
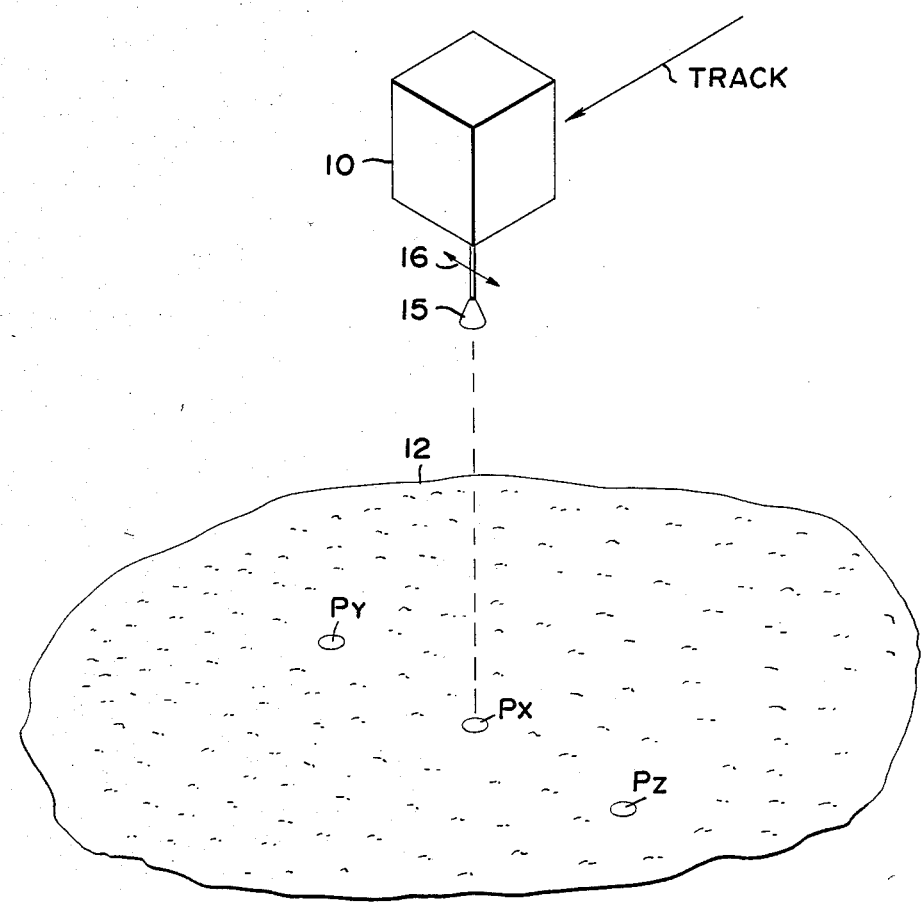
FIG. 1 is an isometric view of a satellite above a large body of water.
Figure 2:
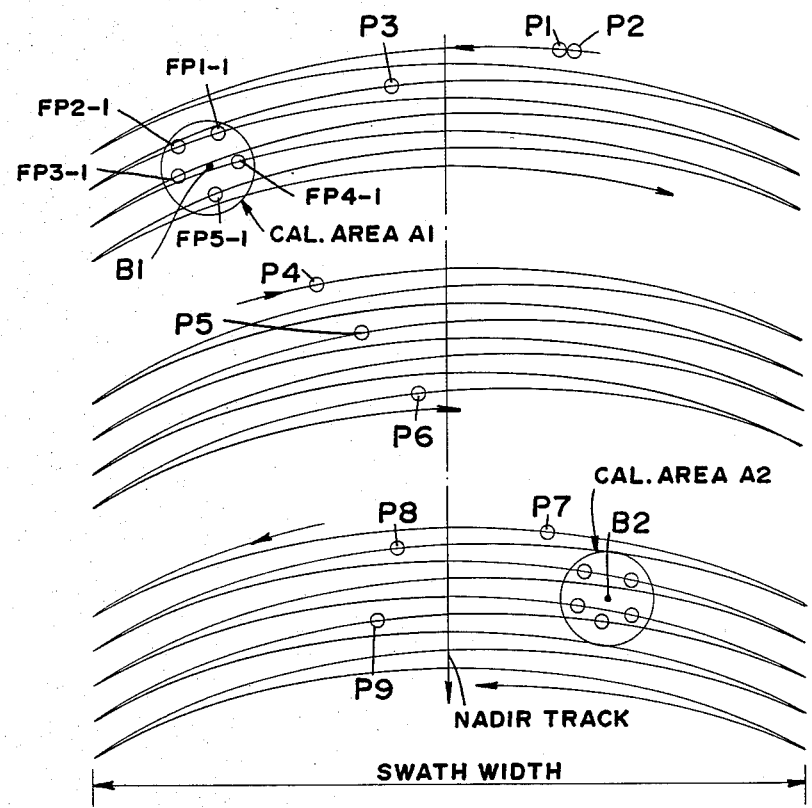
FIG. 2 is a scan pattern diagram of an antenna and various pixel and calibration areas, useful in explaining the invention.

Attention is first directed to FIGS. 1 and 2. FIG. 1 is a simplified diagram of a satellite 10 which is assumed to travel along a particular track or path, high above a large surface area of an ocean, represented by numeral 12. The satellite 10 includes a receiver, which will be described hereafter in connection with FIG. 3, and its associated antenna 15. The latter is shown pointing directly downwardly at a nadir incremental area or pixel (Px). The antenna is made to swing back and forth, as represented by numeral 16, to cover a swath of a selected width, e.g. 600 km. Assuming that the incremetal area, or pixel from which signals are received is a circle, 20 km in radius, during each swatch, signals are received from 600/20=30 adjacent pixels, such as pixels Py, Pz, etc. A sinusoidal scan pattern of the antenna is shown in FIG. 2.

Therein P1 and P2 designate adjacent pixels from which signals are received during one scan line of the antenna, while P3 represents another pixel from which signals are received when the antenna scans along another line.

The water within each pixel can be thought of as a grey body which radiates radio frequency waves, hereafter referred to as frequencies, within a known relatively wide frequency band as a function of its temperature. The band is typically in the GHz region. The energy which is radiated is frequency dependent, in that its strength (signal amplitude) is not the same for all frequencies. It is for this reason that herein the water is regarded as a gray body, to distinguish it from a black body which radiates energy of constant strength over an entire frequency band.

The pixel size may vary, depending on the height of the satellite above the water surface and the antenna aperture. In one example the pixel area was that of a circle of a diameter on the order of 20 km, i.e. $\frac{1}{2}(10^2)$ or $157(km)^2$. With an antenna swath width of about 600 km, signals are received from 30 adjacent pixels per scan line.

Figure 3:
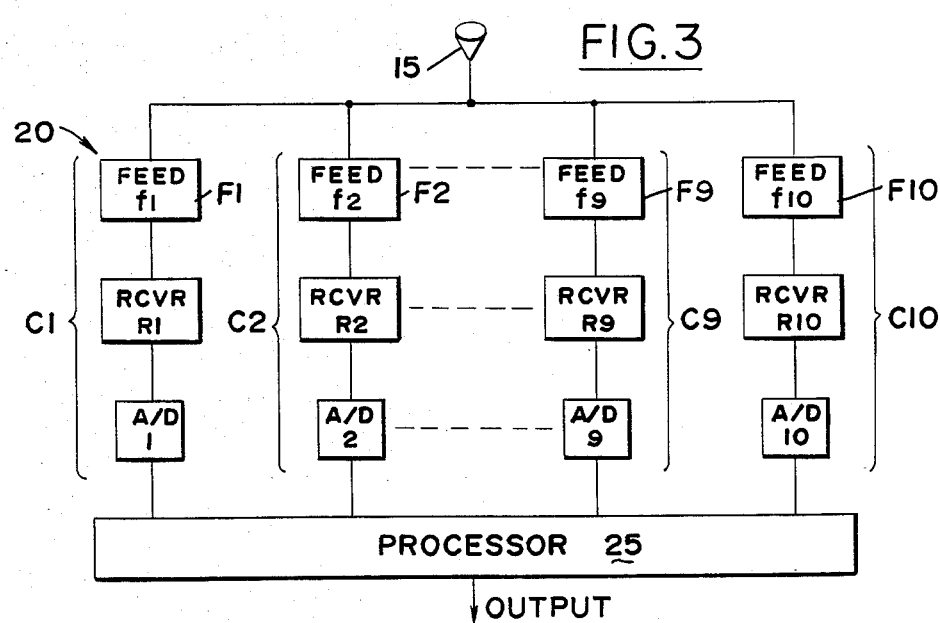
FIG. 3 is a simplified block diagram of the receiver.

Before describing a specific simplified example of the manner in which signals from each pixel may be processed, attention is now directed to FIG. 3, which is essentially a block diagram of a multichannel receiver in accordance with the present invention. The multichannel receiver, which is designated by numeral 20, is fed with the multifrequency signals, received by the antenna 1 from each pixel. The multichannel receiver 20 is assumed to comprise 10 channels, designated C1–C10. Each channel includes a receiver, designated by R and the channel's numerical designation, e.g. R1 for channel C1, R2 for channel C2, etc. Each channel receiver is connected to the antenna 15 through a separate feed which is substantially tuned to pass only signals of a particular frequency. The feeds designated F1–F10 are substantially tuned to 10 different frequencies f1–f10 in the band of interest. Thus, even though antenna 15 receives signals over a wide frequency band, the output of receivers R1–R10 are related only to the strengths of the signals at frequencies f1–f10, respectively.

These outputs which may be in analog form, are converted to digital output signals by analog to digital converters A/D1–A/D10 respectively and are fed in parallel to a processor 25. It is the output of the latter which represents the calculated water temperature of each pixel.

Processor 25 includes storing means such as a memory for storing the digital output signals from the A/D converters for each pixel, as well as the coordinates of each pixel. It also includes means for storing the actually measured water temperatures at each buoy and other signal processing circuitry, needed to process the signals, as will be described hereafter in detail.

For explanatory purposes, one of the memories in processor 25 is diagrammed in FIG. 4 and is designated by numeral 30. Basically, it includes 10 storage locations for the outputs of the 10 channels for each pixel. Also, it includes storage cells for the coordinates of each pixel, which are known, based on the satellite's position and the antenna's scan angle when pointing at each particular pixel.

As will become apparent from the following description, the 10 outputs of the 10 channels for each pixel are not processed right away. Rather, they are first stored, such as in memory 30. Only after the water temperature near several buoys are calculated for calibration purposes, is a determination made of the relative significance of each of the 10 channel outputs for each pixel, remote from any buoy. Based on this determination, are the outputs of the 10 channels, procssed to obtain the pixel's water temperature.

This aspect of the invention may best be explained by referring again to FIG. 2. When the antenna points at pixel P1, the multifrequency signals are received by the antenna 15, are fed to the 10 channels whose outputs, which are frequency dependent, are stored in memory 30 such as in the top row, designated on the left as P1. The 10 outputs of channels C1–C10 are stored in cells headed by column labels C1–C10. Also stored are the coordinates, i.e. latitude and longitude of pixel P1. The same is done for pixels P2, P3, etc.

As the antenna points to a pixel within a certain chosen distance, e.g. 20 km from a buoy desire, such as a buoy designated in FIG. 2 by B1, signals are received from pixels as herebefore explained. The signals of these pixels are used in a calibration process as will be described. To distinguish the pixels within a calibration area around a buoy, such as area A1 around buoy B1, from those outside the area, the pixels within the area will be referred to as footprints (FP) or as calibration pixels. Pixels outside the calibration area may be referred to as noncalibration pixels. For explanatory purposes, the number of foot prints measured in each calibration area, such as A1 around buoy B1, is assumed to be limited to five, although in practice a larger number of footprints is taken. The five footprints in area A1 are designated FP1-1, FP2-1, FP3-1, FP4-1 and FP5-1, wherein the 1 following the hyphen symbol designates the calibration area. Like the 10 channels' outputs for each noncalibration pixel, remote from a calibration area, the outputs for each footprint or calibration pixel are likewise stored in memory 30. However, no processing takes place as yet.

In addition, as the satellite points at buoy B1, it interrogates equipment on the buoy to obtain a signal indicative of the precise water temperature at the buoy, which is continuously measured by a very precise thermometer, down to a fraction of a degree. In practice, measurements are made in degrees Kelvin. However, for explanatory purposes, the following examples will be described in terms of degrees Fahrenheit (F°).

The above-described process continues as the satellite travels along its track path and the antenna scans back and forth and receives multifrequency signals from other pixels such as P4-P9. When the antenna points within another calibration area, such as A2 around buoy B2, signals from 5 footprints FP1-2, FP2-2, FP3-2, FP4-2, and FP5-2 are received and stored in the memory. Again, the exactly measured temperature at buoy B2 is received. The process continues until signals from footprints in additional calibration areas have been received. However, for explanatory purposes, the processing of the stored signals can start once at least signals from two remotely-located calibration areas have been received.

Briefly, initially the signal processing involves the stored signals of the footprints in the two calibration areas to obtain a numerical value of the measured temperature difference between two calibration areas. This value is then divided by the precisely known measured temperature difference at the two buoys to obtain a numerical value per degree or a ratio between difference in amplitude of microwave emissions received from pixels and the difference in sea temperatures represented by the difference in microwave emissions. This value is then used in the processing of the signals from pixels, remote from the calibration areas.

This aspect of the invention may best be explained in connection with a specific numerical example, which is presented for explanatory purposes only. The calibration process includes taking the difference between the stored signals for FP1-1 and FP1-2 for each one of the 10 channels. For the numbers shown in FIG. 2, the differences for channels C1, C2, C9 and C10 are $260-240=20$, $263-240=23$, $264-231=33$ and $259-238=21$. The same is done for channels C3-C8 for which numbers are not shown in FIG. 4.

Once the 10 differences are obtained their average is calculated. Let it be assumed that it is 20. Thus, the average of the differences of all channels C1-C10 for FP1-1 and FP2-2 is 20. A similar average difference is produced for corresponding footprints in the two areas. For example, the channel C1 difference for FP2-1 and FP2-2 is $258-237=21$, for channel C2, the difference is $259-236=23$, etc.

After all the averaged differences are calculated, for the particular example of five footprints per calibration area, one obtains five averaged differences, assumed to be 20 for FP1-1 and FP1-2, 21 for FP2-1 and FP2-2, 18 for FP3-1 and FP3-2, 17 for FP4-1 and FP4-2 and 24 for FP5-1 and FP5-2. These five averaged differences, i.e. 20, 21, 18, 17 and 24 are added and averaged. In the particular example $(20+21+18+17+24)/5=20$. This value 20 represents the calibrated temperature difference between the calibrated areas A1 and A2. Assuming that the actually measured temperatures at buoys B1 and B2 are 65° F. and 60° f., representing a temperature difference of 5° F., the calibrated number 20 is divided by 5, resulting in a number of $20/5=4$ per °F. It is this number that is then used in the determination of the water temperature at each of the pixels outside the calibrated areas, whether the pixel lies on a line between the calibrated areas, such as each of pixles P4-P7, or off the line between the areas, such as pixels P1-P3, P8 and P9.

Let it be assumed that the 10 stored numbers for P4, previously received from channels C1-C10, are 250, 50, 251, 230, 252, 70, 245, 60, 10 and 240, respectively. As herebefore pointed out the water within any pixel acts as a gray body in that it radiates energy at different strengths at difference frequencies. However, by observing the set of the 10 outputs of channels C1-C10 for P4, it becomes clear that some of the outputs are extremely low, as compared to the stronger outputs. For example, the outputs of 50, 70, 60 and 10 of channels C2, tuned to f2, channel C6, tuned to f6, channel C8, tuned to f8 and channel C9, tuned to f9 are much smaller than the outputs of the other channels. This indicates that for some reasons, frequencies f2, f6, f8 and f9 were highly attenuated. The attenuation may have been due to some phenomenon which attenuates energy at certain frequencies more than at other frequencies. Once such phenomenon could have been the presence of clouds between the antenna 15 and pixel P4 when the multifrequency radiation was received. Clouds of different types and thicknesses are known to act as attenuators of energy of different frequencies. Likewise, haze over pixel P4 could have produced high attenuation at certain frequencies.

To prevent such frequency attenuation from affecting the accuracy of the water temperature measurements at Pr a statistically based stepwise regression, a process well known, is employed to discard or assign a low value to the outputs of channels which are determined to be insignificant due to their low outputs and use only or assign higher values to the outputs of those channels deemed more significant.

In the particular example, let it be assumed that a channel with an output less than 30% of the highest value is deemed insignificant. Channels C2, C6, C8 and C9 would be deemed insignificant since the output of any of them is less than $(252)(30/100)$. Once a determination is made which channels are insignificant, only significant channels are used. In the particular example, only the outputs 250, 251, 230, 252, 245 and 240 of channels C1-, C3-C5, C7 and C10 are used in the calculation of the water temperature at P4. Ignoring for a moment the assignment of greater weights (by means of coefficients) to the more significant channels within the group of channels selected as significant, the water temperature at P4 may be determined by adding the outputs of the significant channels and averaging them and then dividing the average by previously calibrated value per degree.

In the example:

$$(250+251+230+252+245+240)/6=244.6$$

Since herebefore it was assumed that 4 units equals 1 degree F, the temperature at P4 designated as $T_{P4}$, may be expressed:

$$\text{as } T_{P4}=244.6/4=61.15° \text{ F.}$$

The above-described process may be further refined by attributing greater weights to the higher channel outputs such as the outputs 250, 251 and 252 of channels C1, C3 and C5 and less weight to the lower outputs 230 and 240 of channels C4 and C10, by the use of coefficients; in order to obtain a more precise average of the outputs of the significant channels, used in performing the measurement. Such weighting is well known and therefore will not be discussed hereafter.

The above-described process is performed to determine the water temperature of any pixel outside a calibration area whether or not it lies on a line between calibration areas or not. However, if desired, water temperature at pixels, not lying on a line between calibration areas, may be performed on the basis of calculated water temperature of pixels lying between calibration areas.

Figure 5:
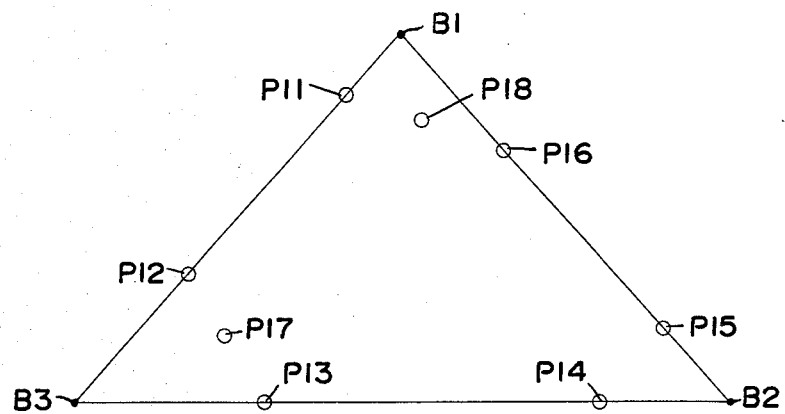
FIG. 5 is a diagram useful in explaining the determination of measurements of phenomena at pixels between calibration areas.

This aspect may be explained in connection with FIG. 5. Therein, B1, B2 and B3 represent buoys, surrounded by their respective calibration areas. Pixels P11 and P12 are shown on a line between B1 and B3, P13 and P14 between B3 and B, and P15 and P16 between B2 and B1. The water temperature at any of these pixels may be calculated as herebefore described. As to pixels P17 and P18, which do not lie on a line between any two buoys, their water temperature may also be calculated as herebefore described. However, if desired, the water temperature at P17, which lies between P12 and P13 may be calculated, based on the calculated water temperatures at P12 and P13. Likewise, the water temperature at pixel P18 which lies between P11 and P16 may be calculated, based on the calculated water temperatures at P11 and P16.

Figure 6:
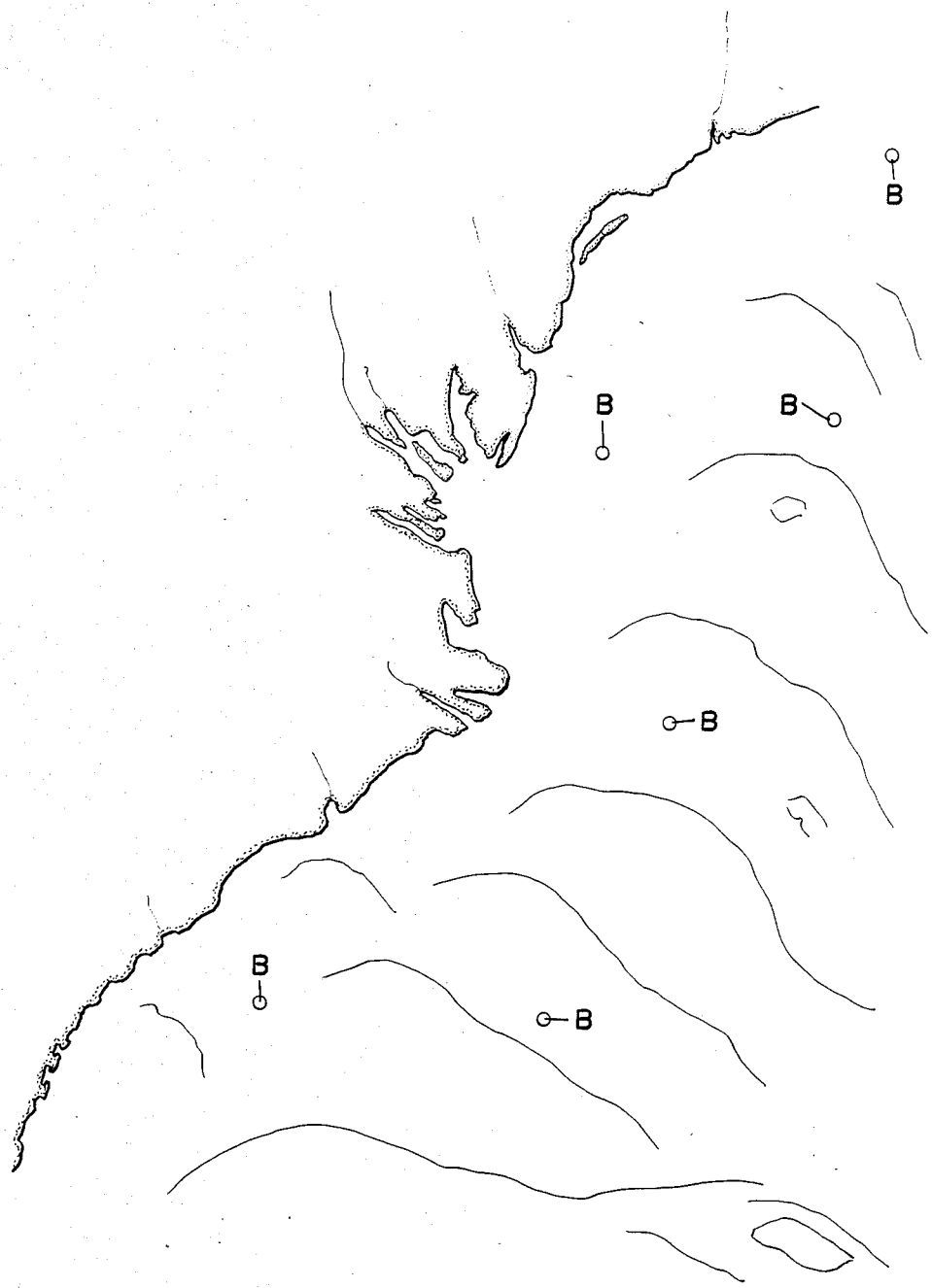
FIG. 6 is a simplified two-dimensional plot of thermolars.

It should be pointed out that the calculated water temperature of each pixel within any large chosen ocean area may first be stored in the processor 25. Then once all the water temperatures have been calculated, the processor may output them to a plotter to produce a two-dimensional display of the water temperatures. If desired, the display may be presented in color with different hues representing different temperatures, or as thermobars. FIG. 6 is a simplified thermobar plot of the water temperature off the Eastern Coast of the U.S.

The foregoing example of determining the water temperature at each pixel was presented in simplified form. In a preferred embodiment, once the outputs of the various channels for footprints in at least two and preferably more calibration areas have been stored, a statistically based forward stepwise regression analysis is performed on the outputs of the various footprints in the various calibration areas on a channel by channel basis. Briefly, a determination is made which channel produced the largest output differences for the known temperature difference between the buoys and the spread of the channel outputs, in order to select the most significant channel, which if used alone would have provided outputs representing water temperature with the greatest accuracy.

Once the most significant channel is determined, the process continues to determine which channel, together with the selected channel, would increase the measurement accuracy. This process continues to select more channels, which when combined with the already selected channels, would increase the measurement accuracy.

At the end of this process, an expression is produced, which is then used to determine the water temperature at each pixel. In general, the expression may be written as follows:

$$W_k = C + k_1(C1) + K_2(C2) + \ldots + K_{10}(C10)$$

where C is a constant and $K_1$ to $K_{10}$ are coefficients for the stored values of each pixel from channels C1–C10. Although all the coefficients are indicated as positive, some may be negative coefficients.

From the foregoing, it should thus be appreciated that in the present invention, the water temperature is not determined based on signals at a single frequency i.e. based on the output of one channel. Rather the water temperature is determined based on the outputs of several channels e.g. C1–C10 which are tuned to different frequencies f1–f10 over a wideband. As a result, the resolution or signal-to-noise ratio is greatly enhanced. This enables one to perform measurements close to noisy environments, such as the Eastern Coast of the U.S. wherein signals at many different frequencies in different regions of the spectrum are transmitted. Also, it should be pointed out that by combining the channels' outputs, the resolution is even greater than that of the narrowest beam (highest frequency) since all signals are received from a small pixel at which the antenna points. Alternately viewed, of each of the wider beams only the portion within the narrowest beam is used. Also, by combining the channels' outputs, sidelobes are suppressed. Such channel combination enables one to take measurements of pixels closer to land, such as at mouhts of rivers flowing into the ocean.

Another most significant point of the invention relates to the manner in which calibration is achieved. By performing the calibration with the water temperatures at the footprints within each calibration area, the calibration is done againt the true surface, i.e. the ocean water at or near the actual buoys, whereat the water temperature is known very precisely. By performing such a calibration, one is able to account for variations in atmospheric conditions, e.g. clouds, rain, etc. between the ocean surface and the satellite. Any calibration which is not against the true surface leads to significant errors.

Although herebefore the invention has been described in connection with measuring water temperature, it is not intended to be limited thereto.

There are other phenomena which can be calibrated and measured at pixels, remote from the buoys. These include wind speed, air temperature and wind direction, as determined by a passive pattern. The presently-existing buoys include instruments which measure air temperature, and pressure as well as wind speed. These measured values can also be interrogated by the satellite as it passes over each buoy. As to pixels, remote from a buoy, even though the received signals from each of them relate to water temperature, there is a clear correlation between such temperature and the other phenomena. Knowing the exactly measured water temperature, wind speed ait temperature, pressure and wind direction at each buoy and the correlation between buoys, the correlation can be used to calculate the values of these other phenomena at each pixel, once its water temperature has been calculated.

As to measurements of certain phenomena on land, rather than over water, the present invention may be used to measure moisture content of the soil, using deserts, lakes, forests as calibration points. One can also measure snow boundaries, the moisture and temperature of large bodies of snow, as well as rain patterns, in a manner similar to that herebefore described.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method of measuring sea surface water temperatures over a large area of the sea, wherein there are a plurality of widely spaced buoy devices lying within calibration areas wherein the precise sea temperature is known, comprising:

scanning the sea, by means of receiving antenna supported in a satellite which travels along a known track over said area, to receive signals over a preselected wide frequency from incremental areas definable as pixels, including calibration pixels which lie inside said calibration areas and noncalibration pixels which lie outside said calibration areas;

detecting the amplitudes of signals at a predetermined number of different frequencies within said band received from each noncalibration pixel;

for each pixel storing said amplitudes;

receiving, from a plurality of calibration pixels, signals over said preselected wide band of frequencies;

detecting the amplitudes of the signals at different frequencies recived from each calibration pixel;

for each calibration pixel storing said amplitudes;

received from each buoy device a precise measurment of the sea temperature thereat;

utilizing the stored amplitudes of signals received from at least two different calibration pixels to determine the sensitivity and degrees of significance of signals at said different frequencies in measuring said sea water temperature; and utilizing said determined degrees of significance of signals at said different frequencies to measure the sea temperatures at said noncalibration pixels.

2. A method of detecting the temperature of water in incremental areas of a large body of water, wherein at each of a plurality of known locations in said body the water temperature is actually measured and is communicatable to a satellite travelling over said body and having an antenna for receiving water temperature-related signals and a receiver connected to said antenna to receive the signals received thereby, the steps comprising:

causing said antenna to scan in a preselected pattern to receive from incremental areas definable as pixels, water-temperature related signals, at frequencies over a preselected band;

providing in said receiver a plurality of channels each tuned to a different frequency in said band;

applying the received signals from each pixel to said channels, whereby each channel provides an output related to the strength of the signals at the channel frequency which were received;

for each pixel, storing the outputs of the channels responsive to the signals received from said pixel;

utilizing the stored outputs of the channels for pixels within each of a plurality of calibration areas which are around each of said known locations and the actually measured water temperature thereat to determine the relative significances of the outputs of the various channels in the measurements of the water temperatures around said known locations; and utilizing the determined relative significances of the outputs of the various channels, and the actual stored outputs of the channels for each pixel that is remote from a calibration area to determine the water temperature at the pixel.

3. A method for measuring the temperature of water at the sea surface, over a large area of the sea, by a satellite which has a microwave antenna that can detect microwave emissions from the sea surface, comprising:

establishing a plurality of widely spaced buoy devices in said area of the sea, wherein each buoy device transmits signals representing the precise temperature of the at the buoy device;

detecting microwave emissions from a multiplicity of limited areas or pixels of the sea from said satellite, including detecting emissions from calibration pixels that are close to the locations of said buoy devices so the sea surface temperature is substantially the same as at the buoy device, and from noncalibration pixels that are far from a buoy device;

determining the ratio between a difference in the amplitude of microwave emissions received from pixels and the difference in sea temperature represented by the difference in microwave emissions, by measuring the change in emissions from at least two of said buoy devices whose difference in sea temperatures is precisely known; and determining the sea temperature at each of a plurality of noncalibration pixels according to the magnitude of microwave emissions detected from the pixel, based on the temperature at at least one buoy device and the determined relationship between a difference in amplitude and the difference in temperature.

* * * * *